(12) United States Patent
Cohen

(10) Patent No.: US 10,045,165 B2
(45) Date of Patent: Aug. 7, 2018

(54) PROVISION OF CONTENT TO MOBILE COMMUNICATION DEVICES

(71) Applicant: Robert H. Cohen, West Hollywood, CA (US)

(72) Inventor: Robert H. Cohen, West Hollywood, CA (US)

( * ) Notice: Subject to any disclaimer, the term of this patent is extended or adjusted under 35 U.S.C. 154(b) by 69 days.

(21) Appl. No.: 14/231,220

(22) Filed: Mar. 31, 2014

(65) Prior Publication Data

US 2014/0214542 A1 Jul. 31, 2014

Related U.S. Application Data

(63) Continuation of application No. 13/354,248, filed on Jan. 19, 2012.

(60) Provisional application No. 61/433,975, filed on Jan. 19, 2011.

(51) Int. Cl.
*H04W 4/12* (2009.01)
*H04W 4/14* (2009.01)
*H04W 4/18* (2009.01)
*G06Q 30/02* (2012.01)

(52) U.S. Cl.
CPC .......... *H04W 4/12* (2013.01); *G06Q 30/0257* (2013.01); *H04W 4/14* (2013.01); *H04W 4/18* (2013.01)

(58) Field of Classification Search
CPC .............................. G06Q 30/02; G06Q 30/08
USPC ........ 455/466, 414.1–414.4; 705/14.4–14.53
See application file for complete search history.

(56) References Cited

U.S. PATENT DOCUMENTS

| | | | | |
|---|---|---|---|---|
| 7,729,709 B1* | 6/2010 | Loeb | ...................... | H04L 67/18 455/2.01 |
| 8,621,536 B1* | 12/2013 | Hendren | ............... | H04L 51/046 455/466 |
| 2006/0218040 A1* | 9/2006 | Sabapathypillai | ..... | G06Q 30/06 705/15 |
| 2006/0248012 A1* | 11/2006 | Kircher | ................ | G06Q 10/107 705/50 |
| 2007/0004424 A1* | 1/2007 | Sheen | ..................... | H04W 4/02 455/456.1 |
| 2007/0042777 A1* | 2/2007 | Govindarajan | ....... | H04W 68/12 455/435.2 |
| 2007/0105536 A1* | 5/2007 | Tingo, Jr. | ............... | G06Q 30/02 455/414.1 |
| 2007/0118443 A1* | 5/2007 | Haque | .................. | G06Q 10/087 705/14.1 |
| 2008/0114650 A1* | 5/2008 | Ku | ......................... | G06Q 30/02 705/14.23 |
| 2008/0305815 A1* | 12/2008 | McDonough | .......... | H04L 51/38 455/466 |
| 2009/0068991 A1* | 3/2009 | Aaltonen | ............... | G06Q 30/02 455/412.1 |
| 2009/0203359 A1* | 8/2009 | Makhoul | ................ | G06Q 30/02 455/412.2 |
| 2009/0228325 A1* | 9/2009 | Simmons | ......... | G06Q 10/06313 705/7.23 |

(Continued)

*Primary Examiner* — Dung Hong
(74) *Attorney, Agent, or Firm* — Klein, O'Neill & Singh, LLP

(57) ABSTRACT

A system and method for provision of content in messages sent to a mobile communications device. The additional content may be selected based on information associated with a user. In some embodiments the additional content includes a proposal from a vendor.

38 Claims, 14 Drawing Sheets

(56) References Cited

U.S. PATENT DOCUMENTS

| | | | | |
|---|---|---|---|---|
| 2009/0299853 A1* | 12/2009 | Jones | G06Q 30/02 | |
| | | | 705/14.46 | |
| 2010/0094689 A1* | 4/2010 | Fodor | G06Q 10/10 | |
| | | | 705/14.1 | |
| 2010/0124907 A1* | 5/2010 | Hull | G06Q 30/02 | |
| | | | 455/412.1 | |
| 2010/0174727 A1* | 7/2010 | Zappacosta | G06F 17/30864 | |
| | | | 707/754 | |
| 2011/0276371 A1* | 11/2011 | Norcross | G06Q 30/00 | |
| | | | 705/14.1 | |
| 2012/0016775 A1* | 1/2012 | Ramos | G06Q 30/02 | |
| | | | 705/27.1 | |
| 2013/0005368 A1* | 1/2013 | Hunziker | H04W 12/10 | |
| | | | 455/466 | |
| 2013/0041768 A1* | 2/2013 | Llach | G06Q 20/28 | |
| | | | 705/17 | |
| 2013/0290127 A1* | 10/2013 | Finseth | G06Q 30/0611 | |
| | | | 705/26.4 | |

* cited by examiner

US 10,045,165 B2

PROVISION OF CONTENT TO MOBILE COMMUNICATION DEVICES

CROSS-REFERENCE TO RELATED APPLICATION

This present application is a continuation of U.S. patent application Ser. No. 13/354,248, filed Jan. 19, 2012, which claims the benefit of the filing date of U.S. Provisional Patent Application No. 61/433,975, filed Jan. 19, 2011, the disclosures of which are incorporated by reference herein.

BACKGROUND OF THE INVENTION

The present invention relates generally to communications between mobile communications device and more particularly to text messaging between mobile communications devices.

Individuals remote in location from one another have steadily increasing ways to communicate, often without regard to where those individuals may be. Personal communication devices such as cellular capable telephones, often with sophisticated displays and imaging devices, allow individuals to communicate via voice communications or by non-voice means.

Unfortunately, such communications may be expensive to provide, whether in message transfer costs to individuals, cost of communication devices, or otherwise. For example, usage of text based communications over a cellular network may cause a user to bear significant costs.

In addition, such communications, for example textual communications, may not fully utilize capabilities of communication devices, or of communications systems of which the communications devices form a part.

BRIEF SUMMARY OF THE INVENTION

In some aspects, the invention provides a method for use in providing additional content to a mobile communication device, comprising: receiving a text message, the text message having been generated by a user of a first mobile communication device; selecting an item of content out of a plurality of items of content, the selection being based at least in part on stored information regarding the user, the stored information reflecting information of prior text messages of the user, responses by the user to survey questions, and demographic related information of the user; and transmitting, as a text message, the selected item of content to a mobile communication device for display on the mobile communication device.

These and other aspects of the invention are more fully comprehended upon review of this disclosure.

DETAILED DESCRIPTION

Figure 1:
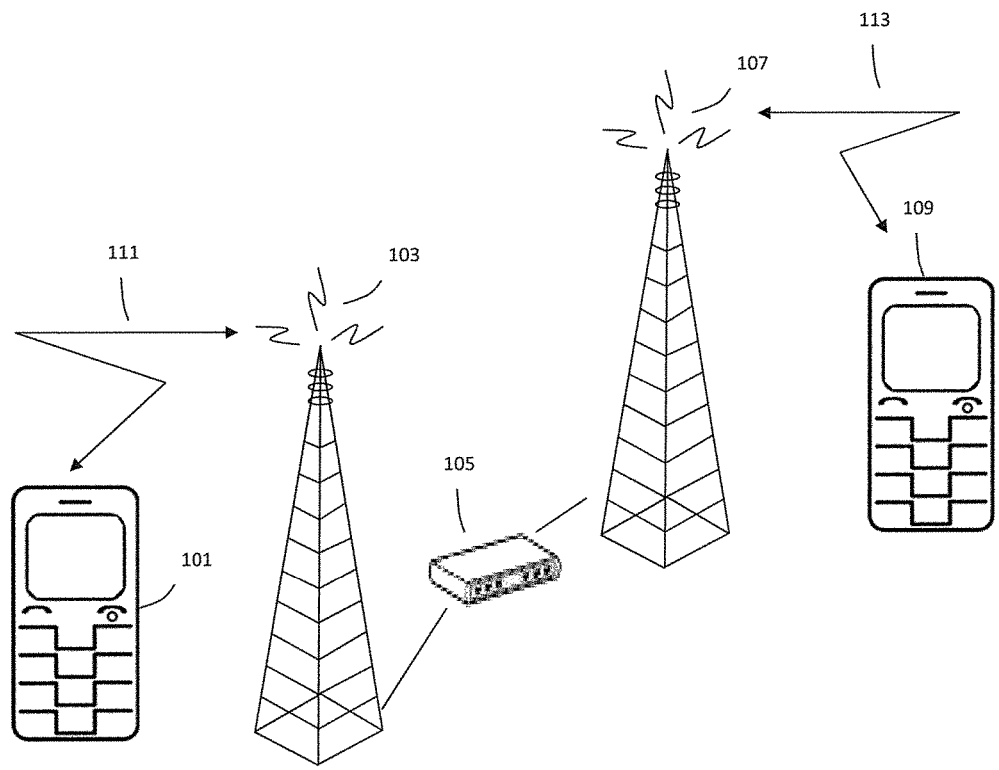
FIG. 1 illustrates an example of a mobile communications device communication system in accordance aspects of the invention.

FIG. 1 is an example of a mobile communications device communications system in accordance with aspects of the invention. The mobile communications device communications system includes a first mobile communications device 101, a first cell site 103, a message service router 105, a second cell site 107, and a second mobile communications device 109. The first mobile communications device may communicate with the second mobile communications device by way of the first cell site, the message service router, and the second cell site.

The first mobile communications device includes circuitry to connect to the first cell site through a wireless connection 111. In some embodiments, the wireless connection may utilize a Global System for Mobile communications (GSM) protocol, a Code Division Multiple Access (CDMA) protocol or a Time Division Multiple Access (TDMA) protocol. In many embodiments, the first mobile communications device and the second mobile communications device are cell phones.

The first and second cell sites generally includes a tower or other elevated structure for mounting antennas, and one or more sets of transmitter/receivers transceivers, digital signal processors, and control electronics. The cell sites may also include a GPS receiver for timing and backup electrical power sources. In operation, information from the first mobile communications device is provided to a second communications device by way of the first cell site, the message service router and the second cell site. In addition, in various embodiments, the cell site may not directly communicate with a mobile communications device, with, instead, communications with the mobile communications device being by way of a repeater interposed in a communication path between the cell site and the mobile communications device.

In some embodiments, the information from the first mobile communications device includes text information generated by a user of the first mobile communications device, and also includes additional content. The additional content may be, for example, advertisement content stored on the first mobile communications device or downloaded to the device prior to transmission of the text information. In other embodiments, the additional content may be assembled with the text information at a point or points in a communications path between the first mobile communications device and the second mobile communications device.

Figure 2:
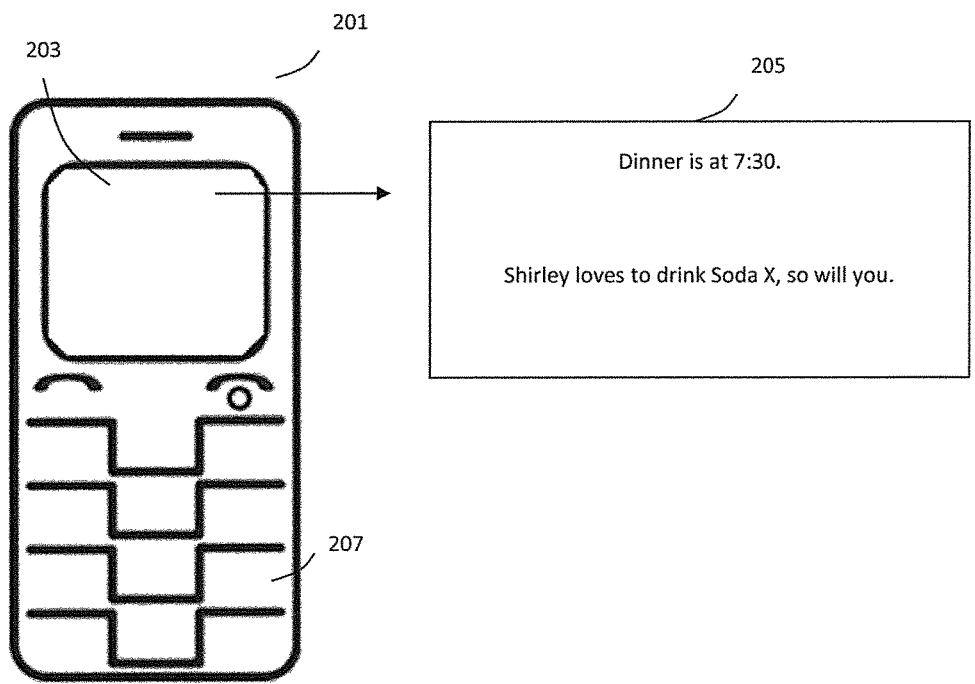
FIG. 2 illustrates an example of a mobile communications device with a received text message and additional content in accordance with aspects of the invention.

FIG. 2 is an example of a mobile communications device and a message 203 in accordance with aspects of the invention. The mobile communications device generally includes a housing 201 which houses communication and related circuitry. In some embodiments, and as illustrated in FIG. 2, the housing includes a keypad 207 for entering information, and a display 203 for displaying information. In some embodiments, the housing may include a touchscreen, which combines the input and display aspects of the device. The display shows a received message 205. The message includes a message sent by another party, with the message type commonly referred to as a text message. As illustrated in FIG. 2, the message states: "Dinner is at 7:30." Appended to the message is additional content. The additional content in FIG. 2 is in the form of advertising content, advertising a "Soda X" brand of soft drink. In addition, the advertising content, which states: "Shirley loves to drink Soda X, so will you," includes a personalization feature, identifying the sender of the message, namely, Shirley, as endorsing the product advertised by the advertising content.

Figure 3:
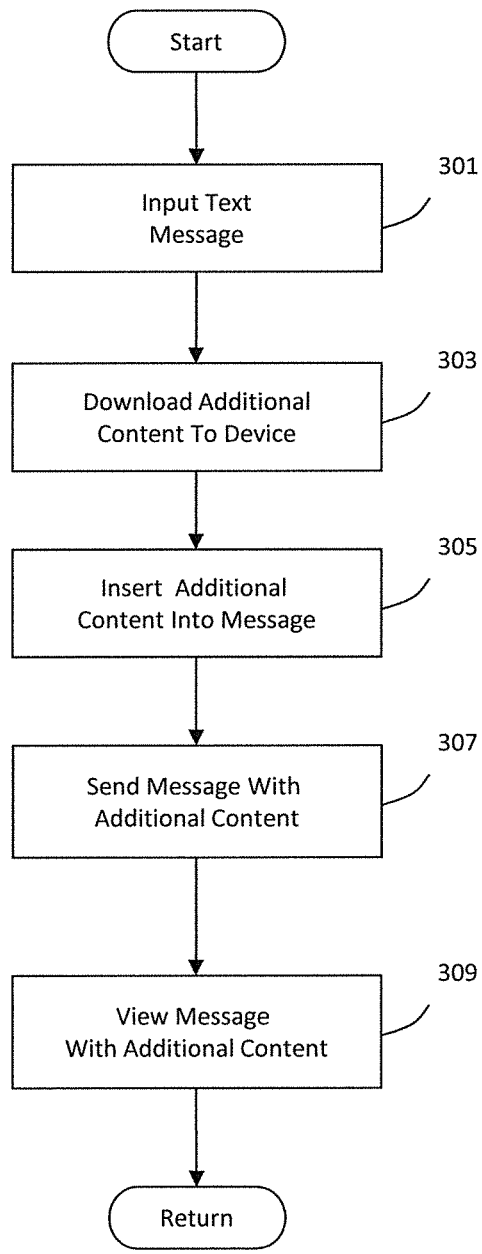
FIG. 3 is a flow diagram of additional content insertion by a mobile communications device in accordance with aspects of the invention.

FIG. 3 is a flow diagram of mobile communications device messaging system in accordance with aspects of the invention. In block 301, the process receives a text message input by a user into a mobile communications device. In many embodiments, the mobile communications device is a cell phone. In many embodiments, the text message, when transmitted, conforms to the Short Message Service (SMS) communications standard. In some embodiments, the text message comprises text only. In some embodiments, the text message comprises pictures and/or graphics. In some embodiments, the text message comprises a combination of text and pictures and/or graphics. In many embodiments, the sender may input a text message by using a keypad or a touchscreen of the mobile communications device. In some embodiments, the user may select from a plurality of standard and saved messages. For example, the user may select a previously saved message to from a list of saved messages.

In block 303, the process downloads additional content to the user's mobile communications device. For example in some embodiments, the mobile communications device is configured to request additional content from a service provider prior to sending a text message, and to receive the additional content from the service provider. In some embodiments, however, the additional content is already resident in memory of the mobile communications device. In many embodiments, the additional content may be in the form of advertising content. In some embodiments, the additional content may be in the form of announcements or news information. In some embodiments, the additional content comprises text. In some embodiments, the additional content comprises pictures and/or graphics. In some embodiments, the additional content comprises a combination of text and pictures and/or graphics. In some embodiments, additional content or a plurality of additional content are downloaded to the user's mobile communications device upon the user entering a text message. In some embodiments, additional content may be downloaded to the sender's mobile communications device at various times. For example, and in some embodiments, an item of additional content or a plurality of items of additional content may be downloaded to the user's mobile communications device upon powering on the mobile communications device and connecting to a communications network. In some embodiments, the item of additional content or a plurality items of additional content may be downloaded to the user's phone at a time during which the user's phone is not in use by the user. In some embodiments, an item of additional content or a plurality of items of additional content may be downloaded to the sender's phone at scheduled intervals, for example, every 2 hours. In some embodiments, the user may configure the time and intervals at which additional content will be downloaded to the mobile communications device.

In block 305, the process inserts additional content into the user's text message. In many embodiments, the additional content is inserted to a portion of the text message where the additional content does not obscure the user's message. For example, the additional content may be appended at the end of the message. In some embodiments, the additional content may be plain text. In some embodiments the additional content may be animated text and/or graphics. For example, the additional content may scroll along a bottom portion of the text message. In some embodiments, the sender may determine where the additional content is placed. In some embodiments, the mobile communications device automatically determines where the additional content is to be placed. For example, the mobile communications device may determine an optimal placement for the additional content based on the number of characters or size of a picture or graphic in the additional content.

In block 307, the process sends the text message from the user's mobile communications device with the additional content. In some embodiments, the user created text message and the attached additional content may be sent in a single transmission. In some embodiments, the user created message and additional content may be sent as separate transmissions. For example, the user created message may be sent first, followed by the additional content.

In many embodiments and as discussed in FIG. 1, the text message is sent from the user's mobile communications device to a cell site. From the cell site, the message is sent to a message service router. In many embodiments, the message service router is a Short Message Service Center (SMSC). The message service router determines an appropriate destination for the text message and transmits the text message to a destination mobile communication device through a cell site. In many embodiments, the message service router will determine the status of a destination mobile communications device before sending the text message. If the message service router determines that the destination mobile communications device is available, the message service router will immediately send the message to the destination mobile communications device through a cell site. However, if the message service router determines that the destination mobile communications device is unavailable, the message service router will store the text message in a database or queue and send the message when the destination mobile communications device becomes available. In some embodiments, the message service router may periodically check the status of the destination mobile communications device until the destination mobile communications device becomes available. For example, the message service router may check the status of the destination mobile communications device every 10 minutes to determine if it has become available. In some embodiments, once the destination mobile communications device becomes, the destination mobile communications device will send a notification to the message service router notifying it of its availability. When the message service router has determined that the destination mobile communications device has become available, the message service router will send the text message to the destination mobile communications device through a cell site.

In block 309, the text message with additional content is received by the destination mobile communications device. In many embodiments, when a mobile communications device receives a text message, device may produce an alert informing the user of the text message. For example, the mobile communications device may produce a sound effect or vibrate. As illustrated in FIG. 2, when the user views the received text message, the text message will include the user created message and the additional content. In many embodiments, the additional content will be at the end of the text message, although in some embodiments, the additional content may be placed at a location as determined by the sender. In many embodiments, the additional content may be in the form of a link and the user may click on the link to view additional details corresponding to the additional content. For example, the additional content may be a link to an advertisement by Vendor A. The user may click the link to the advertisement and view additional details about the advertisement. In some embodiments, for example in some embodiments where the mobile communications device has a capability to view Internet websites, the link may be a link to the advertiser's Internet website.

Figure 4:
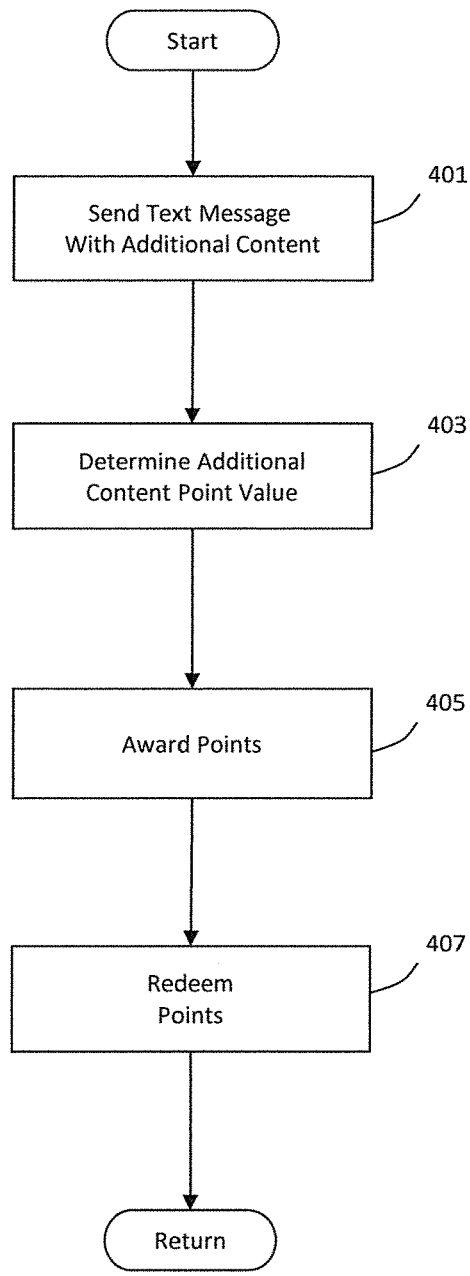
FIG. 4 is a flow diagram of a points system for additional content in accordance with aspects of the invention.

FIG. 4 is a flow diagram of a points system for an additional content service in accordance with aspects of the invention. In block 401, a mobile communications device user sends a message with an additional content to another mobile communications device user. In some embodiments, the user created text message and the attached additional content may be sent in a single transmission. In some embodiments, the user created message and additional content may be sent as separate transmissions. For example, the user created message may be sent first, followed by the additional content. In many embodiments and as illustrated in FIG. 1, the message will be sent through a cell site and to a message service router. In many embodiments, the message service router will be a Short Message Service Center (SMSC). The message service router will determine the destination mobile communications device for the message.

In block 403, the message service router or other component, determines a point value for additional content sent by a user. In many embodiments, additional content may be in the form of advertising content. In many embodiments, items of additional content may be worth varying point values. The message service router has access to a database of additional content and associated point values. In some embodiments, point values for additional content may be related to the size of the additional content. For example, an item of additional content with a greater number of text characters may be assigned a higher point value than an item of additional content with fewer text characters. In many embodiments, additional content which are deemed to be of higher priority may be assigned a higher point value than additional content deemed to be of lower priority. For example, a vendor may seek to increase circulation of its advertisements and may pay a communications service provider a premium price to assign a higher point value to additional content corresponding to the vendor's advertisements. In some embodiments, and to facilitate circulation of a vendor's advertisements, users of the additional content service may be notified of any advertisements that are assigned an increased point value. Users seeking to earn more points may be more likely to select additional content of higher point values. In some embodiments, some additional content may be assigned increased point values during selected periods of time. For example, any additional content relating to a selected television show may be assigned double the standard point values during week leading up to television show and triple the standard point values on the day of the television show.

In block 405, the message service router or other component awards points to the user responsible for sending the additional content. In some embodiments, points may also be awarded to the user receiving the additional content. In many embodiments, the message service router has access to a user database which stores user information, including the number of additional content points accumulated by a user. In some embodiments the message service router awards points after a destination mobile communications device has received a text message with the additional content. For example, if the destination mobile communications device is available and the message service router is able to send the text message with additional content to the destination mobile communications device, the sending user is awarded points. However, if the destination mobile communications device is unavailable, points may not be awarded until the destination mobile communications device becomes available and the message service router is able to confirm receipt of the text message with attached additional content. For example, if the destination mobile communications device is turned off, the message service router may not be able to send the text message with additional content. In some embodiments, the system awards points immediately after the sender sends the text message with the additional content, regardless of whether the destination mobile communications device is available.

In some embodiments, and in embodiments where the additional content may be in the form on a link, the user may click the link to view additional details about the additional content. In some embodiments, points may be awarded to the sender after the receiver has clicked the link and viewed the additional details. In some embodiments, no points may be awarded to the sender if the receiver does not click the link contained in the additional content.

In many embodiments, the message service router or other component may record the number of times a user has sent additional content to another user in a database. In some embodiments and in order to encourage spreading additional content to many different users, the message service router may set a limit on the number points a user may accumulate by sending additional content to the same user within a given time period. For example, a user may be limited to sending a maximum of five items of additional content to the same user within a 24 hour period. If a user has already sent five items of additional content to the same user within a 24 hour period, the message service router may not award points for any additional items of additional content sent to the same user. In some embodiments, the message service router may award points even after the user has reached the limit, however the message service router may reduce the number of points awarded by a scalar value. For example, the message service router may award one half of the full value of the item of additional content once a user has reached the maximum limit. In some embodiments, a user may be limited in the number of points they can accumulate by sending additional content to any single user within a given time period. For example, in some embodiments, a user may not earn more than 20 points per day by sending any number of items of additional content to the same user.

In some embodiments, the message service router or other component may record the number of times a user has sent a specific item of additional content. In some embodiments, and in order to prevent a specific item of additional content from becoming overcirculated, the message service router may set a limit to the number of points a user may accumulate by sending the same item of additional content. For example, a user may be limited to sending the same item of additional content to no more than five times within a 24 hour period. If the user has already sent the same item of additional content five times within a 24 hour period, the message service router may not award any additional points for any further use of the same item of additional content for that 24 hour period.

In block 407, the user redeems accumulated points. In some embodiments, a user may be required to first reach a minimum number of points in order to redeem any accumulated points. In some embodiments, a user may redeem points immediately. In some embodiments, a user may redeem points in predetermined multiples. For example, a user may redeem points in multiples of 10. In some embodiments, points may be used to purchase premium services and features from the user's service provider. For example, points may be used to purchase ring tones and/or custom wallpaper and graphics for use with the user's mobile communications device. In some embodiments, additional content points may be used towards payment of service provider charges. In some embodiments, the additional content points may be exchanged for cash at a predetermined exchange rate.

Figure 5:
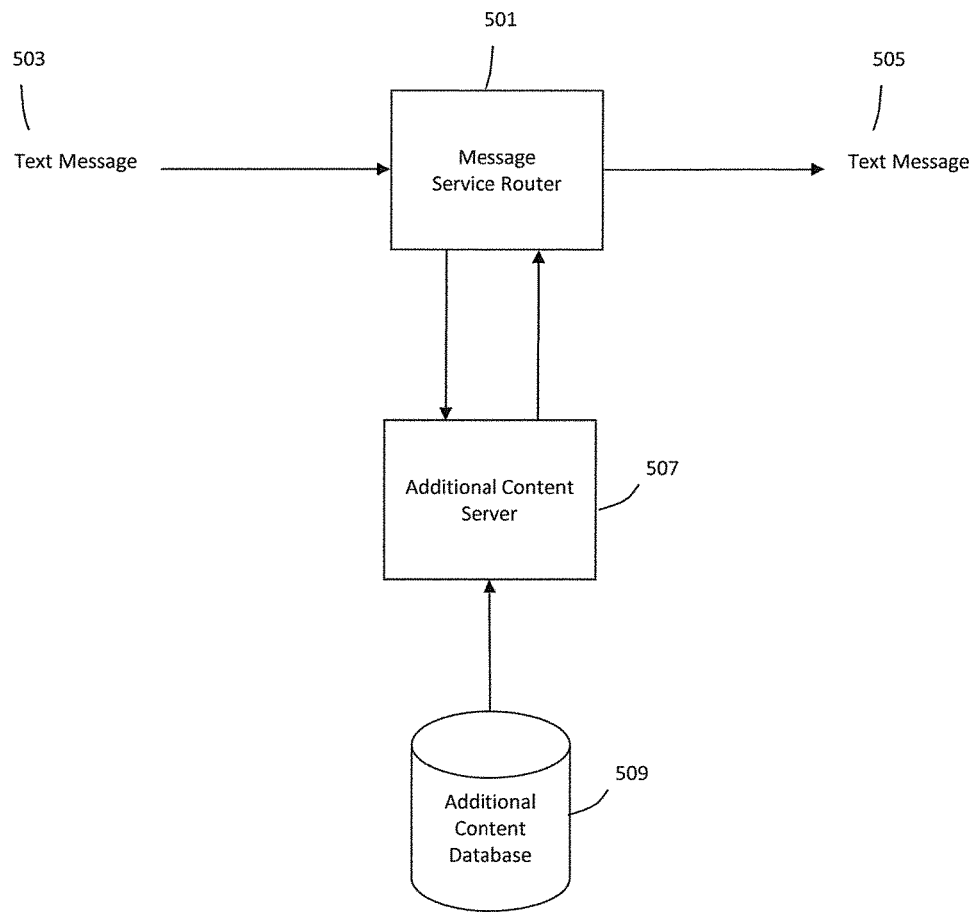
FIG. 5 is a block diagram of additional content insertion by a message service router in accordance with aspects of the invention.

FIG. 5 is a block diagram of additional content insertion by a message service router 501 in accordance with aspects of the invention. A message service router receives text messages 503 from mobile communications devices through cell sites. In many embodiments, the text message conforms to the Short Message Service (SMS) communications standard. In some embodiments, the message service router may be a Short Message Service Center (SMSC).

The message service router determines a destination for each received text message. The message service router also selects additional content to append to each received message. The message service router selects additional content by querying an additional content server 507. The additional content server queries an additional content database 509. In some embodiments, a user enrolled in an additional content service may select additional content that the user would like to use. For example, from a set of 26 items of additional content, Additional Content A to Additional Content Z, User 1 may select Additional Content B. When the message service router queries the additional content server for additional content for User 1, the additional content server queries the additional content database and returns Additional Content B to the additional content server. The additional content server returns the same to the message service router. In some embodiments, the user may select a plurality of additional content.

In many embodiments, the additional content may be in the form of advertising content. In many embodiments, each item of additional content may be assigned a point value. The additional content server provides the message service router with the point value associated with the additional content. The message service router awards the points to the sender of the text message. In some embodiments, the awarded points may be stored on the sender's mobile communications device. In other embodiments, the awarded points may be stored in a user database. The message service router appends the additional content to the text message.

The message service router sends the text message 505 to its destination through a cell site. In many embodiments, the destination will be a mobile communications device, for example a cell phone.

Figure 6:
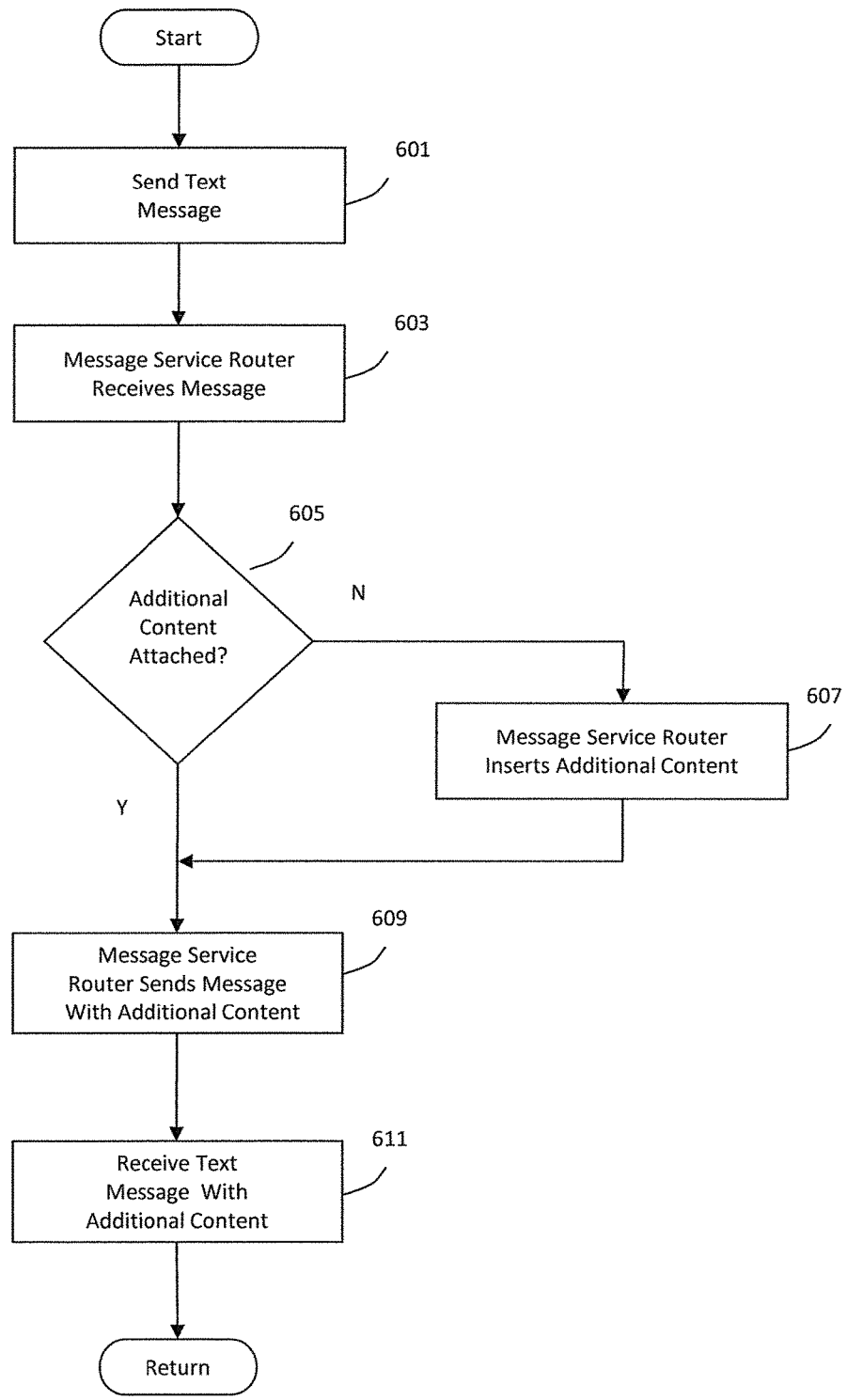
FIG. 6 is a flow diagram of additional content insertion by a message service router in accordance with aspects of the invention.

FIG. 6 is a flow diagram of additional content insertion by a message service router or other component in accordance with aspects of the invention. In block 601, the process sends a text message from the user's mobile communications device with the additional content. In many embodiments, the mobile communications device is a cell phone. In many embodiments, the text message, when transmitted, conforms to the Short Message Service (SMS) communications standard. In some embodiments, the text message comprises text only. In some embodiments, the text message comprises pictures and/or graphics. In some embodiments, the text message comprises a combination of text and pictures and/or graphics. In many embodiments, the sender may input a text message by using a keypad or a touchscreen of the mobile communications device.

In some embodiments, the user created text message and the attached additional content may be sent in a single transmission. In some embodiments, the user created message and additional content may be sent as separate transmissions. For example, the user created message may be sent first, followed by the additional content. In many embodiments and as discussed in FIG. 1, the text message is sent from the user's mobile communications device to a cell site. From the cell site, the message is sent to a message service router.

In block 603, the message service router or other component receives the text message. In many embodiments, the message service router is a Short Message Service Center (SMSC). In many embodiments and as illustrated in FIG. 1, the message service router is connected to a plurality of cell sites. The user's mobile communications device sends a text message by connecting to a cell site. The text message is sent through a cell site and transmitted to the message service router. In some embodiments, the message service router is a Short Message Service Center (SMSC).

In block 605, the process determines whether the text message contains additional content. In some embodiments, additional content may have been added by a user. For example, additional content may have been downloaded to the mobile communications device and sent with the text message as discussed in FIG. 3. In some embodiments, no additional may have been added and the text message In some embodiments, the additional content comprises text only. In some embodiments, the additional content comprises pictures and/or graphics. In some embodiments, the additional content comprises a combination of text and pictures and/or graphics. In other embodiments, the user may have sent a text message which does not contain additional content. If the text message does not contain additional content, the process proceeds to block 607. Otherwise, the process proceeds to block 609.

In block 607, the message service router or other component inserts additional content to the text message. In many embodiments, the additional content is inserted to a portion of the text message where the additional content does not obscure the user's message. For example, the additional content may be appended at the end of the message. In some embodiments, the additional content may be plain text. In some embodiments the additional content may be animated text and/or graphics. For example, the additional content may scroll along a bottom portion of the text message. In some embodiments, the sender may determine where the additional content is placed. In some embodiments, the mobile communications device automatically determines where the additional content is to be placed. For example, the mobile communications device may determine an optimal placement for the additional content based on the number of characters or size of a picture or graphic in the additional content.

In block 609, the message service router sends the text message with additional content. In some embodiments, the user created text message and the attached additional content may be sent in a single transmission. In some embodiments, the user created text message and additional content may be sent as separate transmissions. For example, the user created text message may be sent first, followed by the additional content. In many embodiments and as illustrated in FIG. 1, the message will be sent from the message service router, through a cell site to a destination mobile communications device.

In block 611, the text message with additional content is received by the destination mobile communications device. In many embodiments, when a mobile communications device receives a text message, device may produce an alert informing the user of the text message. For example, the mobile communications device may produce a sound effect or vibrate. As illustrated in FIG. 2, when the user views the received text message, the text message will include the user created message and the additional content. In many embodiments, the additional content will be at the end of the text message, although in some embodiments, the additional content may be placed at a location as determined by the sender.

Figure 7:
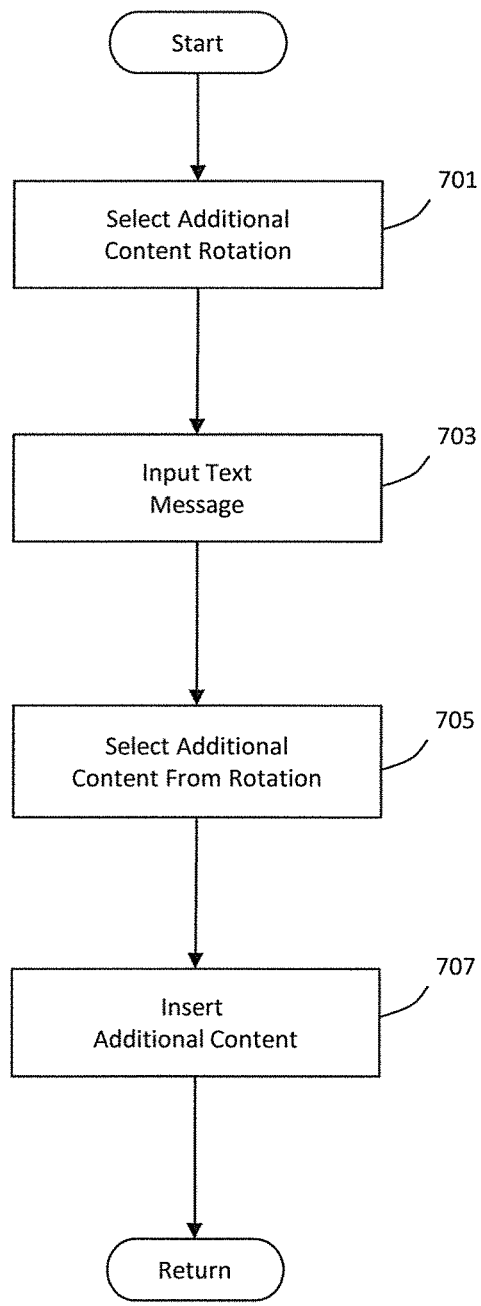
FIG. 7 is a flow diagram of an additional content selection process in accordance with aspects of the invention.

FIG. 7 is a flow diagram of additional content selection in accordance with aspects of the invention. In block 701, the process selects a plurality of items of additional content from a set of items of additional content available to the user. The plurality of items of additional content may be referred to as the user's additional content rotation. In many embodiments, additional content the process may automatically select items of additional content.

In some embodiments, the process may prompt a user who has enrolled in an additional content service to select a number of items of additional content to be used with text messages. In some embodiments, items of additional content may be selected from the user's mobile communications device. In many embodiments, the mobile communications device may be in the form of a cell phone. For example, a text message may be received by the user's cell phone from the service provider prompting the selection a number of items of additional content for use with text messages. The text message may have a list of items of additional content and the user may select items of additional content by responding to the text message with selections.

In some embodiments, additional content may be selected through an Internet web server. For example, the service provider may provide an Internet web server which allows the user to log in and select items of additional content for use with the user's text messages.

In many embodiments, the selected items of additional content may be stored in a database or a database-like storage component. In some embodiments, the database or database-like storage component may be a component of the mobile communications device. In some embodiments, the database or a database-like storage component may be a component of a message service router. The database or a database-like storage component may contain items of additional content or references to items of additional content and associations or references to users.

In block 703, the process inputs a message into a user's mobile communications device to be sent to another user's mobile communications device. In many embodiments, the text message, when transmitted, conforms to the Short Message Service (SMS) communications standard. In some embodiments, the text message comprises text only. In some embodiments, the text message comprises pictures and/or graphics. In some embodiments, the text message comprises a combination of text and pictures and/or graphics. In many embodiments, a keypad or touchscreen of the mobile communications device may be used to input a text message. In some embodiments, a plurality of standardized and saved text messages may be selected by the user, for example, a previously sent text message.

In block 705, an item of additional content is selected from the user's additional content rotation selected in block 701. In some embodiments, one item of additional content may be selected. In some embodiments, a plurality of items of additional content may be selected. In many embodiments, the process may select an item or items of additional content based on the content of the text message. The process may parse the text message for preprogrammed phrases or words and select additional content based on the preprogrammed phrases or words. For example, the text message may contain the word "restaurant" and the process may select an item of additional content relating to food and restaurants. For example the text message may contain the message: "Let's meet at the restaurant for dinner." The process may select an item of additional content relating to restaurants, for example an advertisement by Restaurant A, stating: "Steve likes eating fast food at Restaurant A." In some embodiments, the item or items of additional content may be selected by the user. In some embodiments, the mobile communications device may select the item additional content. In some embodiments, the message service router may select the item of additional content.

In block 707, the item or items of additional content are inserted into a text message. In many embodiments, the additional content is inserted to a portion of the text message where the additional content does not obscure the user's message. For example, the additional content may be appended at the end of the message. In some embodiments, the additional content may be plain text. In some embodiments the additional content may be animated text and/or graphics. For example, the additional content may scroll along a' bottom portion of the text message. In some embodiments, the sender may determine where the additional content is placed. In some embodiments, the mobile communications device automatically determines where the additional content is to be placed. For example, the mobile communications device may determine an optimal placement for the additional content based on the number of characters or size of a picture or graphic in the additional content.

Figure 8:
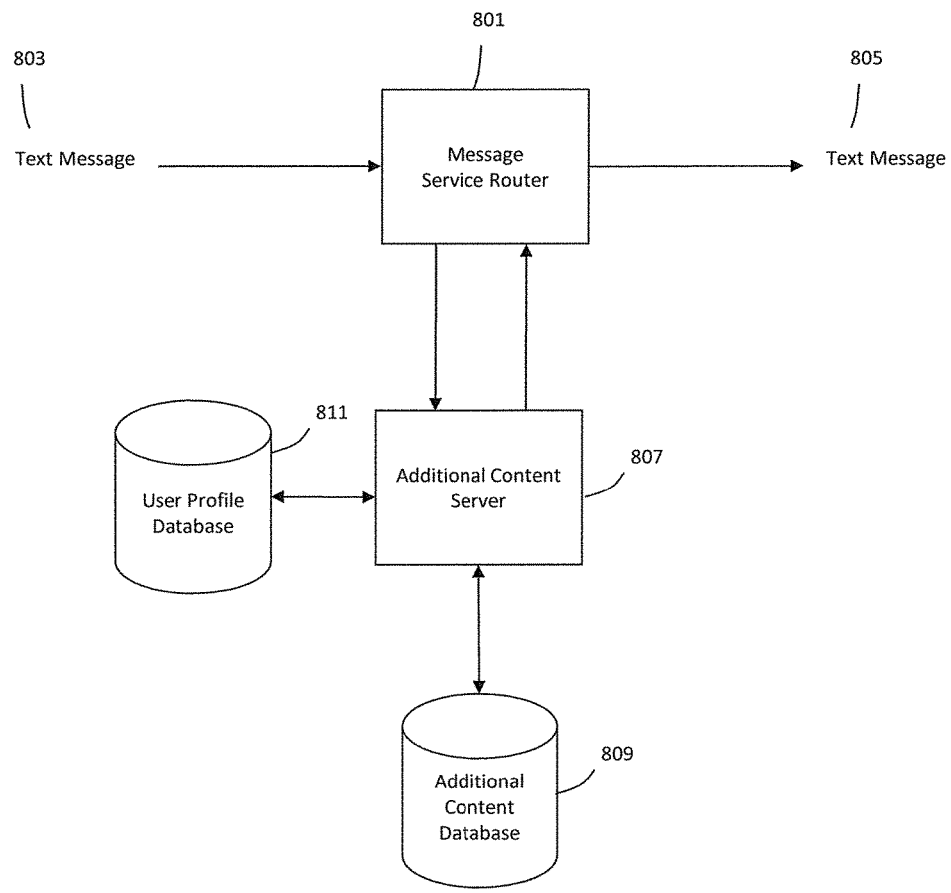
FIG. 8 is a block diagram of a system in accordance with aspects of the invention.

FIG. 8 is a block diagram of a system in accordance with aspects of the invention. In FIG. 8, a text message 803 is received by a message service router 801. The message service router provides the text message to an additional content server 807. The additional content server parses the text message to determine words of the text message. In some embodiments the words of the text message are simply defined by text with spaces on either side attached. In some embodiments the words may be text strings that map to words, for example "RDY" may map to the word "ready." The additional content server stores the words from or derived from the text message as keywords in a user profile database associated with a particular user.

In some embodiments the additional content server additionally stores metadata concerning the keywords. The metadata may include, in various embodiments frequency of use of words by the user (over one or more time scales in some embodiments), numbers of times of use, time since last use, or other information. In some embodiments the keywords may be assigned scores based on the metadata, with the metadata weighted in various embodiments.

In some embodiments multiple user generated and received messages, which may be SMS messages or emails, MMS, IM's or other transmitted documents or messages are used as a source. In such embodiments the additional content server may collect, collate and create a database of multiple repeating written and or spoken syntax phrases, words, pictures, pictograms, phonemes, interpreted sounds, spoken words or any other types of data transmitted by users. The server may also interpret written and/or spoken words or syntax and match the words or syntax with similar written and or spoken words, syntax or any other types of data from a preprogrammed yet evolving database. These data points may be weighted by the frequency and other programmed variables in which they occur over a variable period of time. The weighted score increases each time the phrase, syntax or words are identified. The weighted score also increases or decreases based on other measureable variables. It also identifies and interprets numbers, acronyms and other non textual data points. These data points are also assigned weighted scores.

In addition, the additional content server may receive, via text message or otherwise, additional information regarding a particular user. Some of the additional information may be provided by way of user responses to inquiries or required information as part of a process of registration for service. In various embodiments the additional content server additionally sends survey questions or other inquiries to a user, for example in some embodiments by way of text message. The responses to the survey questions or additional inquiries are also stored with respect to a particular user in the user profile database.

In some embodiments the additional content server collects and organizes an evolving database of responses to periodic questions answered by users. Users may be queried multiple times in a preset time period thru the Internet or via their mobile device (or any other means to reach users) with a small number of survey type questions. These questions preferably identify trends or preferences in the user. Then queries may be posed based on current societal, demographic, political or other user community based events. The queries, in some embodiments change based on previously entered responses. The queries may also evolve, be created and posed to the user based on data points obtained from the information culled from the user's SMS, MMS, IM's or other transmitted documents. At times the system may clarify data points relating to keywords by posing certain clarification and extrapolation queries. These data points, in some embodiments, can be cross-correlated to identify patterns.

In some embodiments the additional content server collects user demographic information based on specific user demographics (age, sex, geographic area of residence, predictive politics, socio-economic status . . . ), e.g. if the user enters a geographically identified address as "living in Los Angeles", the system may make predictions and pose questions based on the users' geographic location. The user may receive a question such as "Do you enjoy beach sports?" This would differ from a user listing Kansas as their geographical address, who may receive a question more appropriately posed based on their specific geographical address. Los Angeles based users may also receive more "politically liberal" questions than users listing Kansas as their geographical location. The system predicts current statistically valid trends and assigns these to the user based on these data points. These assigned predicted trends may be queried and confirmed by the cross confirmation queries posed to the users in the periodic survey questions.

In some embodiments the additional content server utilizes a heuristic algorithm, which identifies, interprets and aggregates the data points from all three sources (messages, surveys, and demographic information) and any additional sources to be determined, then assigns a weighted score to and stores the identified data points. These data points are matched with relevant stored key words and phrases registered by vendors. The vendor based data points are derived from vendor posed questionnaires. Responses to the questionnaires are interpreted and translated into appropriate system recognizable data points. These vendor data points are then assigned a weighted score which may be then "back confirmed" by the vendor before placing in the vendor database. This database may change and evolve based on vendor preferences such as seasonal items, sales of specific items or categories of items or other variables to best target specific users or trends in users, e.g. if a vendor of cooking appliances wants to determine if there is a desire or need for outdoor barbecues, they may submit questions to users based on this specific type of grilling device.

The additional content server also provides the text message, along with additional content from a content database, for example a digital content database, to the message service router. The message service router sends the text message with additional content 805 to a recipient of the text message. In several embodiments, the additional content server selects the additional content, for example an advertisement, as discussed above, or below, or otherwise based on information in the user profile database.

Figure 9:
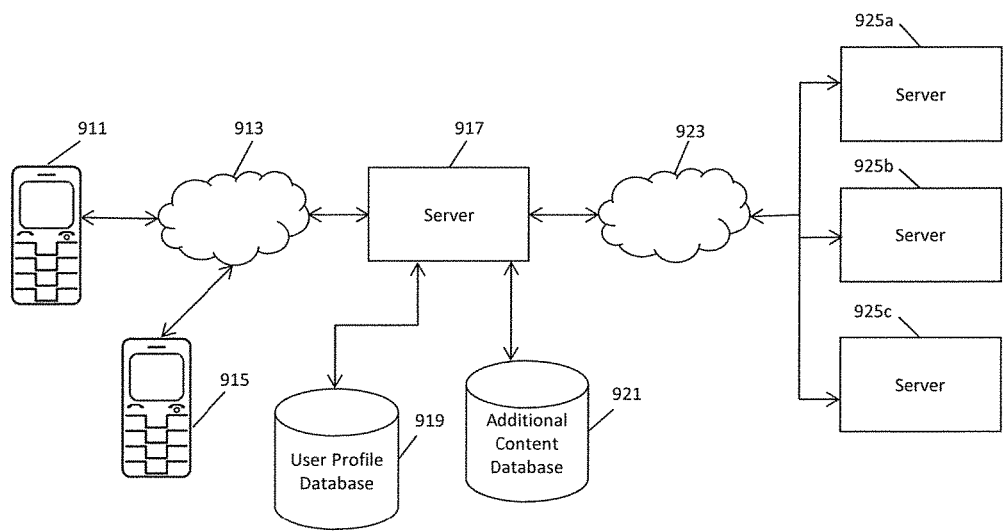
FIG. 9 is a block diagram of a further system in accordance with aspects of the invention.

FIG. 9 is a block diagram of a further system in accordance with aspects of the invention. In FIG. 9 a first mobile device 911 is operated by a first user. The first user, using the first mobile device, may communicate over a network 913 with a second user using a second mobile device 915. As illustrated, the mobile devices are cell phones, and the network will generally include both wireless and wired connections. In operation, a user transmits a message, for example a text message, from the first mobile device and into the network, with the text message either being transmitted to the second mobile device or to a server 917. In some embodiments, for example as discussed with respect to various of the other figures herein, a text message transmitted from the first mobile device to the second mobile device will first, or in addition, be transmitted to the server 917 for inclusion of advertising content into the text message. In some embodiments, however, the text message may simply be sent to the server, with the server providing a responsive text message to the first mobile device.

In such embodiments, for example, the first user may transmit, using the first mobile device, a request for a product or service to the server. The server may elaborate the request using information regarding the user in the user profile database 919. In some embodiments, the server will then determine appropriate advertising content to send to the first user device, with the advertising content and is available in an additional content database 921.

In some embodiments, the server transmits information over a second network 923, with some embodiments the second network and the first network being the same network, to product or service provider servers 925a-c. Information transmitted by the server 917 to the product or service provider servers indicates a request for a product. The servers 925a-c respond to the request with a particular recommendation or deal for products or services from that provider. The server 917 selects one or more responses to send to the mobile device.

In some embodiments the user uses their mobile device to text into the system a "key phrase." The system receives the phrase and compares the phrase to a database of related key words which are tied to programmed advertisements with special deals or discounts. The ads are specifically chosen and presented to users based on a number of factors including related syntax, geographic proximity of the user, or proximity of a recipient of a message from the user, (based on the users GPS location when the key phrase is submitted) and other historical user data.

When a user desires to find a specific type of food (e.g. French cuisine), the user may text into the system "French food". The system will receive their submission, and using a heuristic algorithm find the closest match to the presented words. It will also compare multiple French restaurants based on the geographic proximity of the users GPS location and choose the closest location. Alternatively, the user may enter in a zip code along with the key phrase and the system recognizing the zip code phrase combination, will return to the user a French restaurant(s) in the presented zip code. The system will also compare data history of the user based on past usage of the system, e.g. if the user has shown a preference for modest cost restaurants, it will prioritize these restaurants to be sent to the user.

The user may include multiple variables in the key phrase when submitted to the system. e.g. French food, low cost, casual, ocean view. The system will then return to the user the restaurant with the highest ranking of the presented variables. If the user has previously "rejected" a certain French restaurant, the system will remember the user's actions and filter out this restaurant.

The system will build a database of locations based on multiple users' utilization and feedback data, e.g. if many users submit positive feedback to the system about a certain restaurant or other vendor, the system will prioritize that location for future users. During the course of a month, users will receive random email messages requesting them to rate their past restaurant choices. They will be awarded points for participation. The points can be redeemed for special discounts for future products and services or actual free products or services. Users will be able to rate their choices at the time of service for additional points.

In some embodiments, users who are interested in finding a product or service at a great price immediately but don't have the time or ability to research (e.g. they are in their car) will send an SMS message to the service which returns to the user a number of options "In A Flash." This Flash Deal is valid for a set period of time during which the user must accept the deal from the presenting vendor or the deal expires.

In some embodiments vendors subscribe to the service and load certain data sets identifying their products or services into their customizable database. The system organizes and identifies key words from the submitted data sets for later matching. The vendor also enters in SMS contact information (smartphone phone number) whereby they understand that they can be contacted at the submitted contact number during specific chosen time periods by users looking to use the vendor's services or products. It is understood that the vendor must be able to respond to the potential user within fifteen minutes from receipt of the "Flash." The more key words entered by the vendor, the more expeditiously the vendor is able to respond, and the better the deal they can offer, the better chance they have to make the sale with the user.

Users who want a deal "now" will submit their SMS request in the form of actual requested service or product or type of service or product to the company. The company will "relay" the request to the vendor also by SMS messaging. The vendor will respond within fifteen minutes to the user. The offer will be valid for two hours. All communications will go through the company's servers in order to keep accurate records of requests, offers and all responses by user and vendors. Once the user makes a choice of vendors, they will use their issued "Flash Code" with which to purchase the service or product. The vendor will scan in the presented bar code along with the purchase price and users will accumulate points.

1. Vendors will be charged based on the number of key words they submit for matching.
2. They will be charged each time the system matches their key word to a user's request and relays the request to the vendor.
3. They will also be charged a percentage of the fees that the user pays for the service or product purchased.

Alternatively, vendors will be able to subscribe to a service offered by the company whereby users who want a deal "now" will submit their SMS request in the form of actual requested service or product or type of service or product to the company. The company will "relay" the request to the vendor also by SMS messaging. The vendor will respond within thirty minutes, for example, to the user. The offer will be valid for two hours, for example. All communications will go through the company's servers in order to keep accurate records of requests, offers and all responses by user and vendors. Once the user makes a choice of vendors, they will use their issued "Flash code" with which to purchase the service or product. The vendor will scan in the presented bar code along with the purchase price. Users will accumulate points every time they purchase an item or service from a submitted vendor. These points will be used by users to obtain products or services listed on the services web site.

Figure 10:
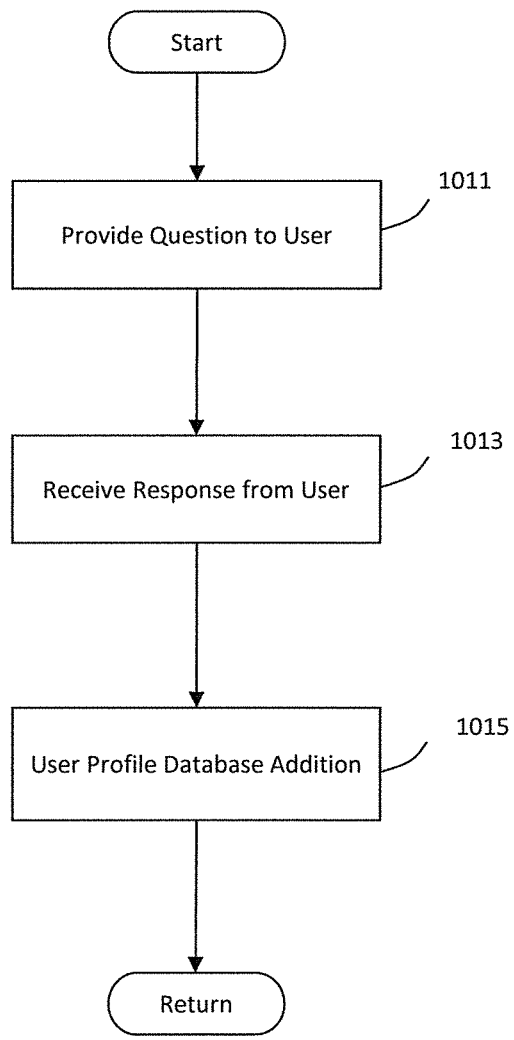
FIG. 10 is a flow diagram of a process for receiving user profile information.

FIG. 10 is a flow diagram of a process for receiving user profile information. In various embodiments the process may be performed by the additional content server 807 of FIG. 8 or the server 917 of FIG. 9. In block 1011 the process provides a question to a user. The question may be provided to the user by way of a text message, or in various other embodiments either by way of an e-mail, automated telephone voice response system, or other means of communication. The question may relate to demographic attributes of the user, activities of the user, likes or dislikes of the user, or other information. In some embodiments, a question, or sets of questions, are periodically provided to the user. In block 1013 and the process receives a response to the question from the user. In block 1015 the process updates user profile information regarding the user using the response to the question. The user profile information may be stored, all in a database of user profile information. The process thereafter returns.

Figure 11:
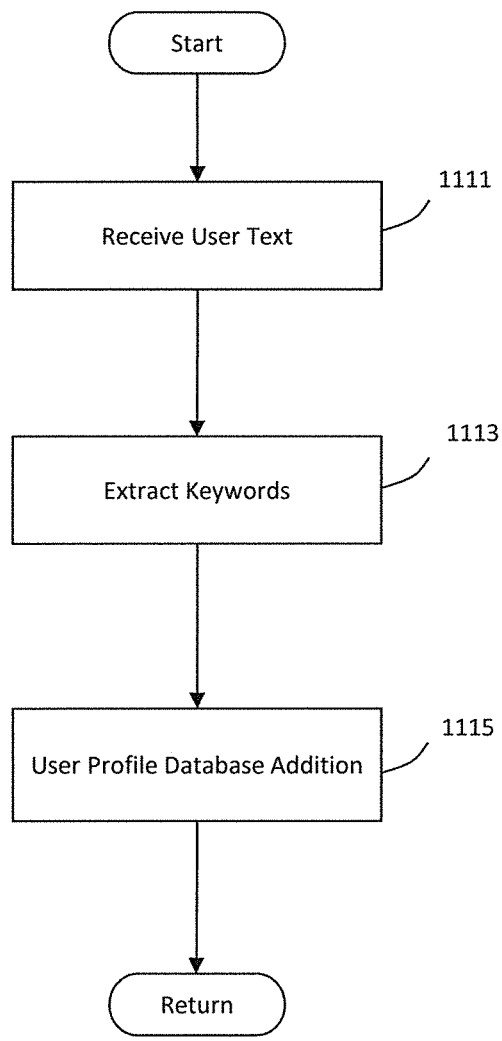
FIG. 11 a flow diagram of a process for processing text messages to determine keywords to associate with a user in accordance with aspects of the invention.

FIG. 11 is a flow diagram of a process for processing text messages to determine keywords to associate with a user. In various embodiments the process may be performed by the additional content server 807 of FIG. 8 or the server 917 of FIG. 9. In block 1111 of the process receives a user text message. In block 1113 the process extracts words from the text message. In extracting the words the process may process and extract text information to determine a corresponding word. In block 1115 in the process updates user profile information regarding the user. The updating of the user profile information may be to include the extracted words as keywords associated with the user. The updating of the user profile information may also include updating a table indicating frequency of use over time of the keywords. The process thereafter returns.

Figure 12:
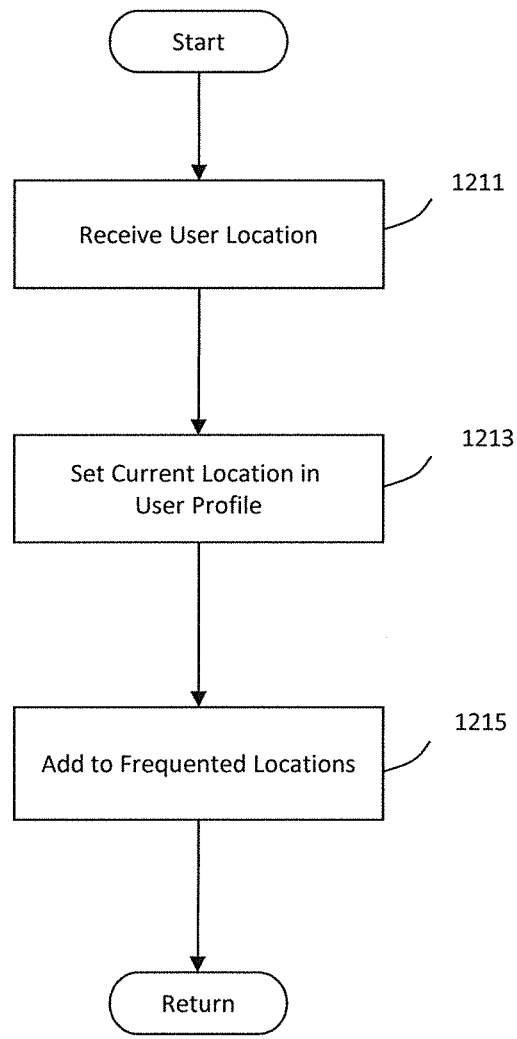
FIG. 12 is a flow diagram of a process for determining geolocation information for a user in accordance with aspects of the invention.

FIG. 12 is a flow diagram of a process for determining geolocation information for a user. In various embodiments the process may be performed by the additional content server 807 of FIG. 8 or the server 917 of FIG. 9. In block 1211 the process receives information as to a user location. The information may be provided by the user explicitly, for example by the user sending the process, or a device performing the process, a text message stating the location of the user. In most embodiments, however, is the information may provided by the user implicitly, for example by way of a user device providing GPS location related information as part of an automatic feature of the user device, or by way of cellular base station providing location information. In block 1213 the process sets a current location of the user in the user profile. In block 1215 the process adds an indication of the current location of the user to a list of frequented locations of the user. In some embodiments of a process also updates a frequency at which the location is visited by the user. The process thereafter returns.

Figure 13:
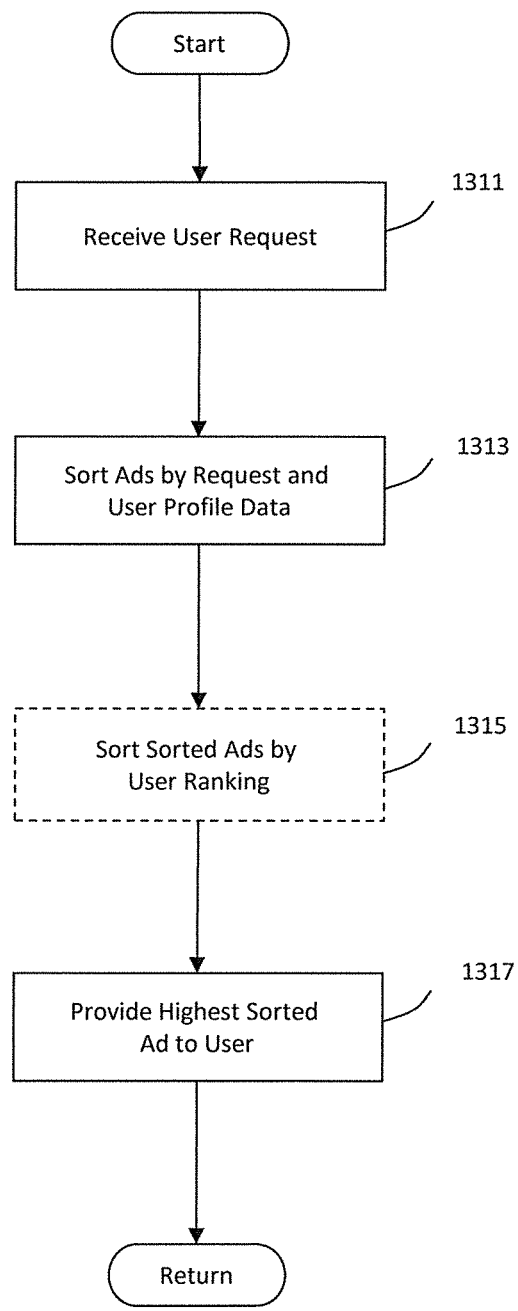
FIG. 13 is a flow diagram of a process for determining advertisement content to be sent to a user in accordance with aspects of the invention.

FIG. 13 is a flow diagram of a process for determining advertisement content to be sent to a user. In various embodiments the process may be performed by the additional content server 807 of FIG. 8 or the server 917 of FIG. 9. In block 1311 the process receives a user request. The user request may relate to it product or a service desired by the user. In block 1313 the process sorts advertisement content for applicability to the user requests and information of the user profile. For example, the user profile may indicate a current location, and advertisement content may relate to particular geographic areas. Accordingly, the process would sort the advertisement content such that advertisement content for the geographic area of the user is ranked higher. In addition, the user profile may indicate a higher frequency of use of the term "fish", and the request may relate to a request for restaurant information. In such an instance the advertisement content may be ranked such that restaurants that include fish in their menu are ranked higher than other restaurants. In optional block 1315 the process additionally sorts advertisement content by user rankings of the service or product, or of the service provider or product provider. For example, in some embodiments users may rate, or rank, particular services or products, or providers of same, with the results of such rankings impacting sort position of the advertisement content. In block 1317 the highest-ranked advertisement content is provided to the user. The advertisement content may be in the form, for example, of text, graphics or other images, barcodes, or other information, or a combination of types of information. The process thereafter returns.

Figure 14:
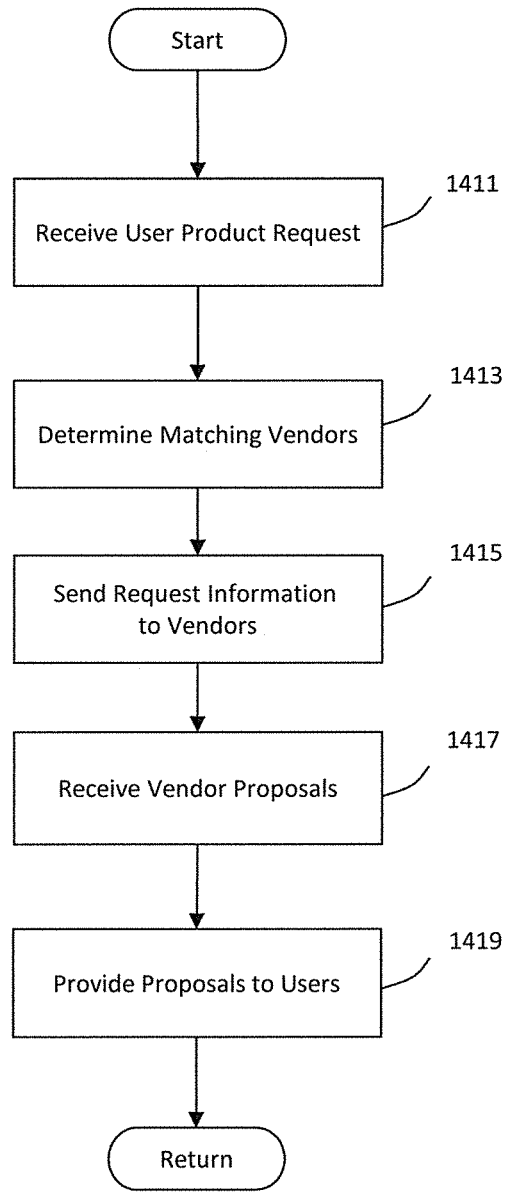
FIG. 14 is a flow diagram of a process for providing vendor proposals to users in accordance with aspects of the invention.

FIG. 14 is a flow diagram of a process for providing vendor proposals to users. In various embodiments the process may be performed by the additional content server 807 of FIG. 8 or the server 917 of FIG. 9. In block 1411 the process receives a user product request. In block 1413 the process determines vendors which provide such products. In block 1415 a process sends the user requests to the matching vendors. In block 1417 the process receives vendor proposals to fulfill the request. The proposals, for example, may be time limited, thereby allowing the vendors to very quickly sell or otherwise dispose of products, or to drive traffic to the vendor location at particular times. For example, the proposals may only be valid for the next two hours, or only on the next Saturday. In block 1419 a process provides the vendor proposals to the user. The process thereafter returns.

In some embodiments a user's request for product or service is transmitted via SMS, IM, WIFI or other communication methods or protocols to a system. The system receives the user's request, and matches information from the user, with matching vendors based on key words transmitted by user, GPS location, user's historical information and/or other user profile based information. The system relays the user's request to "matching" vendors who have previously entered key words matching or similar to the user's request. The vendors may receive relevant user information and return to the user a response in the form of a sale proposal. The user receives, in a timely manner, multiple vendor proposals to the request and chooses one proposal for purchase. The user's acceptance of vendor's proposal is transmitted back to vendor. In some embodiments the vendor transmits a code for a ser to use or present in completing a transaction reflected by the proposal. In some embodiments the user may negotiate with multiple vendors in order to obtain the best deal before choosing one proposal. The user may proceed to a vendor location, present a code and obtains negotiated deal. All negotiations between the user and the vendor are stored on the site for possible future clarification of any misunderstandings, or for other purposes.

Accordingly, aspects of the invention provide additional content for text messaging related systems and methods. Although the invention has been discussed with respect to various embodiments, it should be recognized that the invention comprises the novel and non-obvious claims supported by this disclosure.

The invention claimed is:

1. A method useful in providing vendor proposals to users, comprising:
    receiving, by a server, a request from a user for a product or service, the request communicated using a communications protocol, the request including at least one key word indicative of the product or service;
    determining vendors for providing the product or service;
    sending information regarding the user request to the determined vendors;
    receiving vendor proposals to provide the product or service;
    providing the vendor proposals to the user;
    receiving a user selection of a vendor;
    transmitting the user selection of the vendor to the vendor; and
    providing the user a code from the selected vendor for presentation by the user in completing a transaction with the selected vendor for the product.

2. The method of claim 1, further comprising receiving negotiation information between the user and at least one determined vendor.

3. The method of claim 2, wherein the negotiation information includes negotiation information between the user and a plurality of determined vendors.

4. The method of claim 2, further comprising storing the negotiation information.

5. The method of claim 2, wherein determining vendors for providing the product is based on time periods selected by vendors for vendor availability.

6. The method of claim 1, wherein the received vendor proposals include only those vendor proposals received in a predefined time period of sending of the information regarding the user request to the determined vendors.

7. The method of claim 1, wherein determining vendors for providing the product is based on the at least one key word provided by the user.

8. The method of claim 7, wherein determining vendors for providing the product is further based on at least one key word provided by each of the vendors.

9. The method of claim 1, wherein determining vendors for providing the product is based on location.

10. The method of claim 9, wherein the location is a location of the user and an indication of the location of the user is received with the request.

11. The method of claim 10, wherein the indication of the location of the user is a GPS location of the user.

12. The method of claim 9, wherein the location is a location indicated by the user.

13. The method of claim 12, wherein the location indicated by the user is a zip code.

14. The method of claim 1, wherein determining vendors for providing the product is based on a user's historical information.

15. The method of claim 1, wherein determining vendors for providing the product is based on user profile information.

16. The method of claim 1, wherein the communication protocol is an SMS protocol.

17. The method of claim 1, wherein the communication protocol is an instant messaging (IM) protocol.

18. The method of claim 1, wherein the request is communicated, at least in part, using WIFI communications.

19. The method of claim 1, wherein the server receives the request via a first network and the server sends the information regarding the user request to servers associated with the determined vendors via a second network.

20. The method of claim 19, wherein the first network and the second network are different networks.

21. The method of claim 19, wherein the first network and the second network are the same network.

22. The method of claim 1, wherein the code is a bar code.

23. The method of claim 1, wherein the vendor proposal to the user are time limited.

24. The method of claim 23, wherein the vendor proposals to the user are time limited to a future time period.

25. The method of claim 23, wherein the vendor proposals to the user are time limited to a particular day.

26. The method of claim 1, further comprising transmitting user information to the vendors.

27. The method of claim 1, wherein the server provides the vendor proposals to provide the product to the user.

28. The method of claim 1, wherein the determined vendors provide the vendor proposals to provide the product to the user.

29. The method of claim 1, wherein multiple vendor proposals are provided to the user.

30. The method of claim 1, further comprising storing, by the server, the vendor proposals and the user selection of the vendor.

31. The method of claim 1, wherein the user request includes a phrase.

32. The method of claim 31, further comprising comparing the phrase to key words in a database of key words.

33. The method of claim 1, wherein the user request is communicated using a short message service (SMS) protocol and the information regarding the user request is sent to the determined vendors using an SMS protocol.

34. A system useful in providing useful in the sale of products or services to consumers, comprising:
  a server coupled by way of at least one communications network to a plurality of user mobile devices and a plurality vendors of products or services, the server configured to:
    receive information indicative requests for a product or service from the user mobile devices, each request including at least one word indicative of a requested product or service and information indicative of a location of a user making the request;
    determine vendors of the plurality of vendors supplying the requested product or service in geographic proximity to the location;
    provide information regarding the request to the determined vendors;
    receive vendor proposals to provide the requested product or service from the determined vendors;
    provide the proposals to a user mobile device of the user making the request; and
    receive an acceptance of a one of the proposals from the user mobile device of the user making the request;
    transmit the acceptance of the one of the proposals to the vendor;
    receive a code from the vendor for use by the user in completing a transaction reflected by the acceptance of the one of the proposals; and
    transmit the code to the mobile communication device.

35. The system of claim 34, wherein the server is further configured to receive information of negotiations between the user and the determined vendors.

36. The system of claim 34, wherein the server is configured to provide the information regarding the request to the determined vendors by providing the information regarding the request to servers associated with the determined vendors.

37. The system of claim 34, wherein the server is configured to provide the information regarding the request to the determined vendors by providing the information regarding the request by way of a short message service (SMS) message.

38. The system of claim 34, wherein the request is received as an instant message.

* * * * *